UNITED STATES PATENT OFFICE.

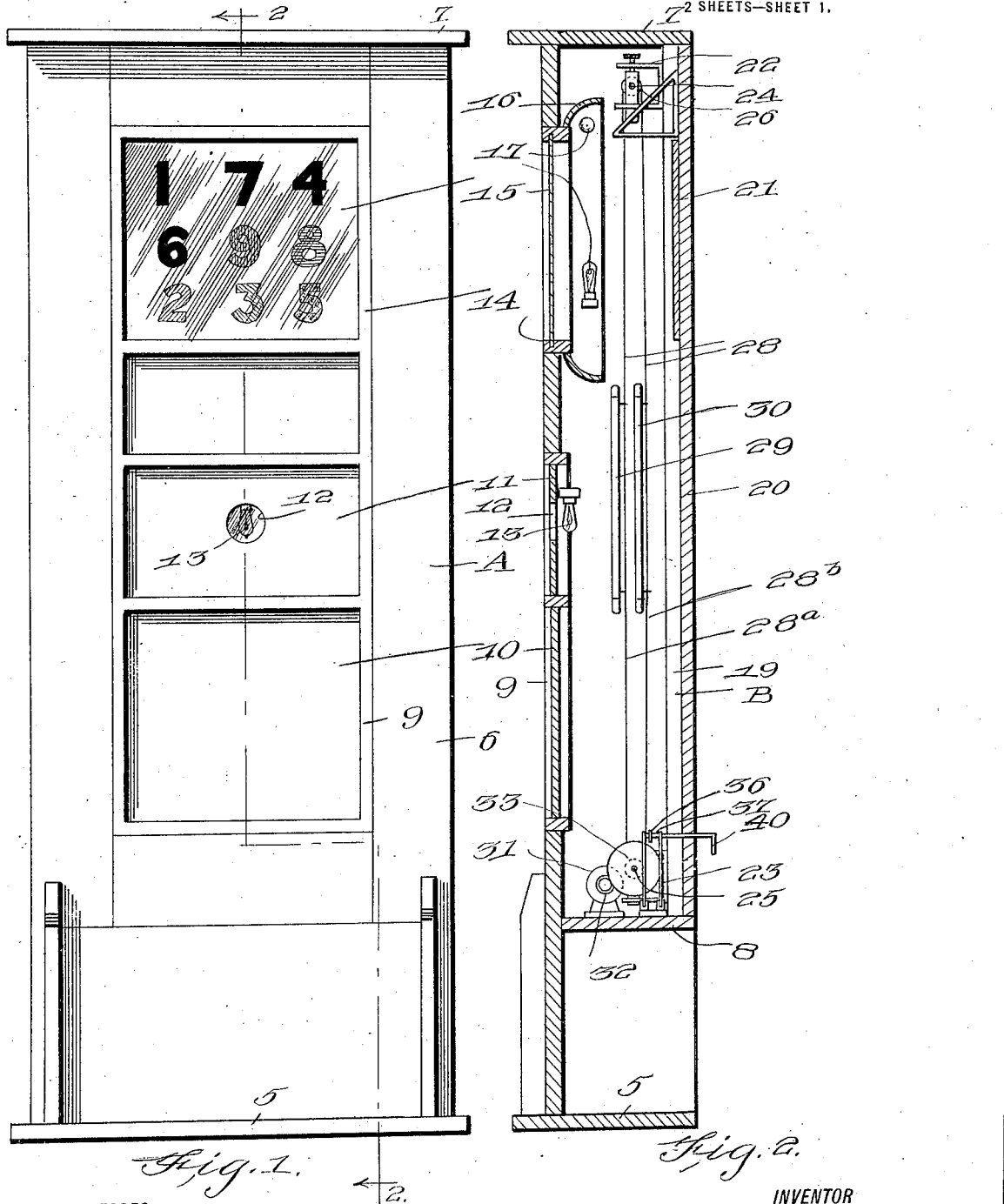

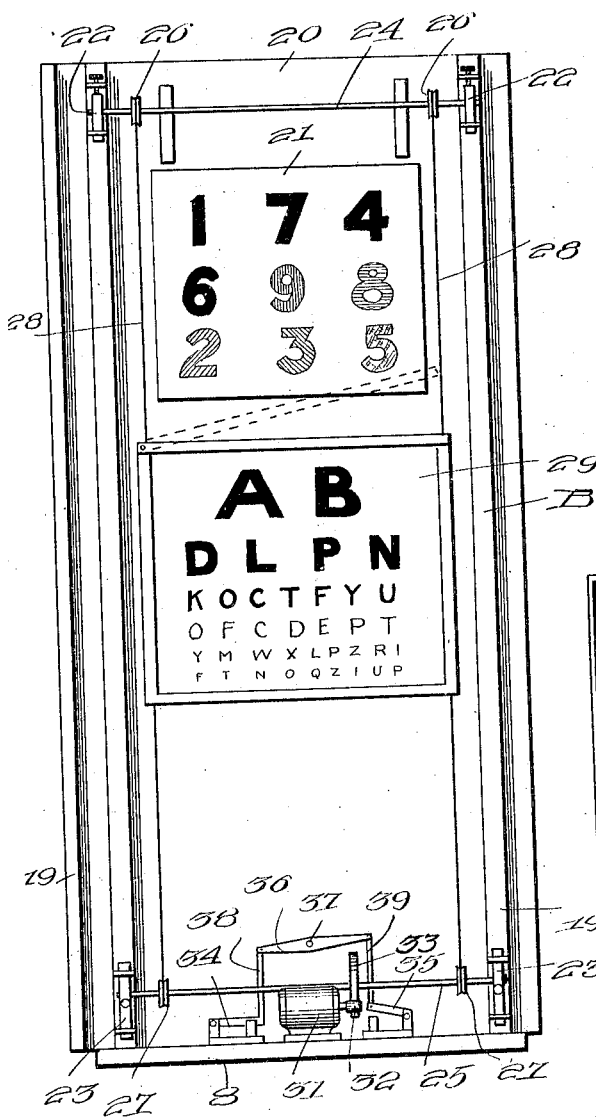

JAMES A. BELL, OF BREMERTON, WASHINGTON.

OPTICAL TESTING APPARATUS.

1,402,829.  Specification of Letters Patent.  Patented Jan. 10, 1922.

Application filed September 4, 1920. Serial No. 408,317.

*To all whom it may concern:*

Be it known that I, JAMES ALBERT BELL, a citizen of the United States, and a resident of Bremerton, in the county of Kitsap and State of Washington, have invented certain new and useful Improvements in Optical Testing Apparatus, of which the following is a specification.

My invention relates to improvements in optical testing apparatus, and more particularly to an improvement of this character embodied in a cabinet, and is a continuation in part of my co-pending application, filed October 25, 1919, Serial No. 333,299, as to all matter common to the two applications.

The object of my invention is to provide an optical testing apparatus of this character in which the requisite test charts are presented directly in a patient's line of vision, within a well lighted aperture or window and which displays but one chart at a time so as not to confuse the patient by requiring him to look at various charts simultaneously displayed, which is of simple and durable construction, reliable in operation and easy and inexpensive to manufacture and which embodies simple but effective means for changing charts by the exercise of a remote control.

Other objects and advantages of the invention reside in certain novel features of construction, combination and arrangement of parts as will be hereinafter more fully described and particularly pointed out in the appended claims, reference being had to the accompanying drawings forming part of this specification, and in which:

Figure 1 is a front elevational view of the testing apparatus;

Figure 2 is a vertical sectional view thereof on line 2—2 of Figure 1;

Figure 3 is a front elevational view of the frame holding the testing charts and operating mechanism;

Figure 4 is a face view of the astigmatic chart;

Figure 5 is a front elevational view of the deflector; and

Figure 6 is a diagrammatic view of the motor control.

Referring to the drawings it will be seen that the testing apparatus comprises a cabinet, designated generally at A and a chart and motor carrying frame, designated generally B.

The cabinet A comprises a base 5, a front 6, and a top 7, the back of the cabinet being open to receive the chart and motor carrying frame, as will be hereinafter more fully described. As more especially shown in Figure 2 a shelf 8 is provided a slight distance above the bottom 5 for a purpose which will be hereinafter more fully described. The front 6 is cut away and receives a frame 9 having panels 10 and 11. The panel 10 is of glass and the panel 11 is opaque but has a transparent spot 12 therein. An electric light 13 is suspended from the top of the frame 9 or is suitably carried by the panel 11 as desired and lies behind the transparent spot 12 of the opaque panel 11. The transparent spot 12 is used in the well known manner in carrying out the strabismus test. The front 6 is also provided with an upper opening to receive the frame 14 carrying a transparent glass panel 15. A curved metallic reflector 16 is arranged upon the inner portion of the frame 14 and itself carries a plurality of electric lamps 17. The glass panel 15 constitutes a lighted window or aperture through which the test charts are observed.

The chart and motor carrying frame B is placed in the cabinet A through the open back thereof and comprises side rails 19 and a backing 20 (see Figure 3). A fixed color blind chart 21 is secured to the back 20 of the motor of the frame B and is so positioned thereon as to be permanently alined with the lighted aperture or window constituted by the glass panel 15. The color blind chart as more particularly illustrated in Figures 1 and 3 preferably consists of nine figures of different colors.

The upper end of the frame B carries spaced adjustable bearings 22 and the lower end of the frame carries small spaced adjustable bearings 23. The upper adjustable bearings 22 carry a horizontal pulley shaft 24 and the lower bearings 22 carry a similar horizontal pulley shaft 25. Spaced pulleys 26 are carried by the shaft 24 and spaced pulleys 27 are carried by the shaft 25 and are disposed in alinement with the spaced pulleys 26. Endless cords, cables or similar flexible elements 28 are arranged to extend around the alined pairs of pulleys, as shown in Figure 3. This endless cord or cables 28 thus constitute two runs designated at $28^a$ and $28^b$, as particularly shown in Figure 2. A letter type chart 29 of the type shown in Figure 3 is secured to the front run 28ª of the cable and an astigmatic chart 30 of the type illustrated in Figure 4 is secured to the rear run 28ᵇ of the cable. Both of the charts 29 and 30 are positioned on their respective runs of the cable to face the lighted aperture constituted by the glass panel 15 and they are adapted to be selectively positioned in alinement therewith.

An electric motor 31 is carried by the shelf 8 and the armature of the electric motor by means of a frictional pinion 32 drives a friction wheel 33 fixed to the horizontal pulley shaft 25. Thus the motion of the armature is imparted to the pulley shaft 25 and from the pulleys and cords 28 to the charts 29 and 30 so as to selectively aline these charts with the lighted aperture defined by the transparent glass panel 15.

Means is provided for reversing the direction of rotation of the armature of the motor 31 and includes knife switches 34 and 35, respectively which are adapted to traverse the direction of flow of the current through either the armature or the field winding. A rocker 36 carried by the rock shaft 37 is connected by links 38 and 39 respectively, to the knife switches 34 and 35, respectively. A control lever 40 serves to transmit the desired motion to the rock shaft. The control lever 40 may be actuated by remote control of any desired type.

For the sake of illustration there is shown in Figure 6 a diagrammatic view of an elementary type of wiring system for controlling the motor 31 and reversing the direction of rotation of the armature thereof. In this diagram the main line is designated at M and the branches thereof at m. The main line terminals are designated at T and the knife switch terminals are designated at S. It is to the terminals S that the blades of the knife switch are pivoted, as shown in Figure 3. Accordingly as the blades of the knife switch 34 or the knife switch 35 are engaged with the terminals T of the main line the current flows in the normal direction or in the reverse direction through the armature so as to reverse the direction of rotation thereof in the well known manner.

In practice, it is obvious that the motor and the chart carrying frame B is arranged within the cabinet and if desired it may be hinged thereto.

The light 13 shines through the transparent spot 12 of the opaque panel 11 and as before stated is used for conducting the strabismus test.

The fixed color blind chart 21 is permanently alined with the aperture or window constituted by the transparent panel 15 and is normally visible therethrough, as it is illuminated by the electric lights 17, the light from which is directed thereon and by the reflector 16.

When it is desired to use either the letter type or the strabismus chart the remote control of the motor 31 is exercised in the desired manner so as to close either the knife switch 34 or the knife switch 35. This latter causes the pulley shafts to rotate so as to elevate either the run 28ª or the run 28ᵇ of the cable and carry either the letter type chart 29 or the astigmatic chart 30 up into alinement with the aperture. When either of these charts is alined with the aperture they are illuminated by the light from the lamps 17 directed thereon by the reflector 16 and as they lie in front of the fixed color blind chart they conceal the same while they are exposed for observation. The same lighted aperture is thus effective to display in proper or desired sequence the series of test charts and only one of the test charts is displayed or exhibited at a time so that the patient is not confused by being required to observe a number of charts simultaneously displayed.

I claim:

1. An optical testing apparatus comprising a cabinet having a transparent opening therein, a frame mounted in the cabinet, a shaft rotatably mounted in the frame adjacent the lower end thereof, endless cables extending around the shafts, a motor mounted upon the frame and connected to one of the shafts, and charts secured to the cable, said charts adapted to be brought into alinement with the transparent opening in the cabinet by the operation of the motor.

2. In an article of the class described, an optical testing cabinet having an annular direct lighted aperture for strabismus testing, a multi-colored numbered chart for testing color blindness, a lighted reflector for illuminating same, a distance reading type, and an astigmatic type operatively mounted on electrically driven belts, with means for distant control by the operator.

3. In an article of the class described, an optical testing cabinet, comprising a light for strabismus test, a multi-colored chart for color blind test, a distant reading chart and an astigmatic chart, all being arranged to be exposed electrically, one at a time.

4. A testing apparatus of the character described comprising a cabinet having an opening therein, a frame positioned in said opening, a transparent glass panel carried by said frame and constituting a test aperture, a reflector arranged on said frame within the cabinet carrying electric lights, a chart and motor carrying frame arranged in the interior of said cabinet, a fixed color blind chart carried by said chart frame and permanently alined with said aperture, an upper horizontal pulley shaft and a lower horizontal pulley shaft adjustably journaled on said chart frame, spaced pulleys carried by said shafts, endless cords carried by said spaced pulleys so as to constitute a front run and a rear run, a letter type chart carried by one of the runs of said cords, an astigmatic chart carried by the other of said runs whereby said charts may be selectively alined with the aperture, an electric motor carried by said chart and motor carrying frame, friction gearing for driving the lower shaft from the armature of said motor and means for reversing the direction of rotation of said armature including a pair of knife switches, and a control lever actuated rocker for operating said switches.

5. A testing apparatus of the character described comprising a cabinet having an opening therein, a frame positioned in said opening, a transparent glass panel carried by said frame and constituting a test aperture, a reflector arranged on said frame within the cabinet carrying electric lights, a chart and motor carrying frame arranged in the interior of said cabinet, a fixed color blind chart carried by said chart frame and permanently alined with said aperture, an upper horizontal pulley shaft and a lower horizontal pulley shaft adjustably journaled on said chart frame, spaced pulleys carried by said shafts, endless cords carried by said spaced pulleys so as to constitute a front run and a rear run, a letter type chart carried by one of the runs of said cords, and an astigmatic chart carried by the other of said runs whereby said charts may be selectively alined with the aperture.

6. A testing apparatus of the character described comprising a cabinet having an opening therein, a frame positioned in said opening, a transparent glass panel carried by said frame and constituting a test aperture, a reflector arranged on said frame within the cabinet carrying electric lights, a chart and motor carrying frame arranged in the interior of said cabinet, an upper horizontal pulley shaft and a lower horizontal pulley shaft adjustably journaled on said chart frame, spaced pulleys carried by said shafts, endless cords carried by said spaced pulleys so as to constitute a front run and a rear run, a letter type chart carried by one of the runs of said cords, and an astigmatic chart carried by the other of said runs whereby said charts may be selectively alined with the aperture.

JAMES A. BELL.